(12) United States Patent
Asami

(10) Patent No.: US 7,436,605 B2
(45) Date of Patent: Oct. 14, 2008

(54) IMAGING LENS AND CAMERA APPARATUS

(75) Inventor: Taro Asami, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/864,382

(22) Filed: Sep. 28, 2007

(65) Prior Publication Data

US 2008/0080065 A1    Apr. 3, 2008

(30) Foreign Application Priority Data

Sep. 29, 2006   (JP)  ............................. P 2006-268866

(51) Int. Cl.
*G02B 9/12* (2006.01)
*G02B 3/02* (2006.01)
*G02B 9/00* (2006.01)

(52) U.S. Cl. .................. 359/784; 359/716; 359/740

(58) Field of Classification Search ................ 359/784, 359/708, 716, 761, 762, 770, 781–783, 738, 359/740

See application file for complete search history.

(56) References Cited

U.S. PATENT DOCUMENTS 7,304,808 B2 * 12/2007 Hirose et al. ................. 359/784

FOREIGN PATENT DOCUMENTS

| JP | 10-170821 A | 6/1998 |
|---|---|---|
| JP | 3206930 B2 | 7/2001 |
| JP | 2001-337268 A | 12/2001 |
| JP | 2005-181596 A | 7/2005 |
| JP | 2005-321742 A | 11/2005 |
| JP | 2006-168683 A | 6/2006 |

* cited by examiner

*Primary Examiner*—William C. Choi
*Assistant Examiner*—Jack Dinh
(74) *Attorney, Agent, or Firm*—Birch, Stewart, Kolasch & Birch, LLP

(57) ABSTRACT

An imaging lens is configured sequentially from the object side by: a first lens having a meniscus shape where a convex surface is directed to the object side; a second lens; and a positive third lens in which an image-side surface is a convex surface. The first lens, the second lens, and the third lens are configured by a bi-aspherical plastic lens. The second lens is configured by a bi-convex lens in which the absolute value of the radius of curvature of the object-side surface is smaller than that of the image-side surface. The third lens is a positive lens and a meniscus lens in which a concave surface is directed to the object side, and a convex surface is directed to the image side.

24 Claims, 14 Drawing Sheets

FIG. 9

IMAGING LENS AND CAMERA APPARATUS

BACKGROUND OF THE INVENTION

1. Field of the Invention

The present invention relates to an imaging lens which is suitably used in a vehicle camera, a surveillance camera, a camera for a portable telephone, or the like, and which forms an optical image on a solid-state imaging device, and also relates to a camera apparatus comprising the lens.

2. Description of Related Art

A vehicle camera for imaging the surrounding of a vehicle is known (for example, see JP-A-2006-168683). Such vehicle cameras include: an out-vehicle camera which is disposed outside a vehicle, and which images, for example, a blind zone of the driver's vision to assist the driving operation; and an in-vehicle camera which images a field of view identical with the driver's vision field in order to record the status of occurrence of a traffic accident or the like. In accordance with enhancement of performance and cost reduction of a solid-state imaging device, recently, vehicles having a vehicle camera are becoming popular.

Among imaging lenses in the background art, an imaging lens disclosed in JP-A-2001-337268 comprises a first lens which is a meniscus lens having a negative refractive power, and positive second and third lenses, sequentially from the object side. All the surfaces other than the object-side surface of the first lens are formed as an aspherical surface, so that excellent telecentricity and a wide field angle are realized. An imaging lens disclosed in JP-A-2005-181596 comprises a first lens which is a meniscus spherical glass lens having a negative refractive power, and second and third lenses which are aspherical plastic lenses having positive refractive powers, and realizes the brightness of F 2.6 and a wide field angle of 80 degree or more. An imaging lens disclosed in JP-A-2005-321742 is configured by three plastic lenses in which the surface closest to the object side is a spherical surface, and the other surfaces are formed as an aspherical surface, and realizes the brightness of F 2.96 and a wide field angle of 150 degree or more. Endoscope imaging lenses disclosed in Japanese Patent No. 3206930 and JP-A-10-170821 comprise a plano-concave lens and two positive lenses sequentially from the object side, and simultaneously realize excellent telecentricity and compactness.

However, the imaging lenses disclosed in JP-A-2001-337268, JP-A-2005-181596 and JP-A-2005-321742 are insufficient in miniaturization. The imaging lens disclosed in Japanese Patent No. 3206930 uses high-refractive index glass as the first lens, and hence has a disadvantage that the cost is high. The imaging lens disclosed in JP-A-10-170821 has the F-number of 3.8 or more, and hence is dark. Therefore, the imaging lens is not suitable for use in a vehicle camera, surveillance camera, or the like which is not always used in an environment of adequate brightness.

SUMMARY OF THE INVENTION

An object of an illustrative, non-limiting embodiment of the invention is to provide an imaging lens which can maintain excellent optical performance, and which is reduced in size, weight, and cost, and also a camera comprising the imaging lens.

According to an aspect of the invention, there is provided an imaging lens including sequentially from the object side, a first lens of a negative lens having a meniscus shape and having a convex surface on the object side; a second lens having at least one aspherical surface; and a third lens of a positive lens having a convex surface on the image side and having at least one aspherical surface. An aperture diaphragm is disposed between the second lens and the third lens, and the imaging lens satisfies following conditional expressions:

$$0<|f2/f3|<0.49 \tag{1}$$

$$1.5<v3/v2 \tag{2}$$

$$0.5<|f1/f23|<3.0 \tag{3}$$

where f1, f2, and f3 are focal lengths of the first lens, the second lens and the third lens, respectively, v2, and v3 are Abbe numbers of the second lens and the third lens, respectively, and f23 is a composite focal length of the second and third lenses.

When exceeding the upper limit of conditional expression (1), it is possible to obtain a long exit pupil distance, but it is difficult to achieve miniaturization and increased wide angle of the imaging lens. When failing to satisfy the range of conditional expression (2), it is difficult to sufficiently correct lateral chromatic aberration. When exceeding the upper limit of conditional expression (3), it is difficult to extend the filed of view, and at the same time the curvature of field is increased. When being below the lower limit of conditional expression (3), the field of view can be increased, but coma aberration is increased and the image quality of a peripheral portion of an image surface is impaired.

In order to sufficiently correct the curvature of field, distortion, and the like, at least one surface of the first lens may be formed as an aspherical surface. In order to further correct the curvature of field and coma aberration, the first lens may be configured by a lens in which the both surfaces are formed as an aspherical surface. In order to obtain an excellent image in which chromatic aberration of magnification is corrected, the second lens may be configured by a material having the Abbe number of 40 or less, and the first and third lenses may be configured by a material having the Abbe number of 40 or more.

Furthermore, the imaging lens may further satisfy a following conditional expression:

$$0<L/f<10.0 \tag{4}$$

where L is a distance between an apex of the object-side surface of the first lens and an image plane of the imaging lens, and f is an overall focal length. This configuration is suitable for reducing the size of the imaging lens. Preferably, the imaging lens may satisfy a following conditional expression:

$$0<L/f<5.50 \tag{4'}$$

By the satisfying the conditional expression (4'), the wide angle of the imaging lens can be held and reduction of the size of the imaging lens can be achieved.

According to an aspect of the invention, there is provided an imaging lens including sequentially from the object side, a first lens of a negative lens having at least one aspherical surface having a concave surface on the image side; a second lens having at least one aspherical surface; and a third lens of a positive lens having a convex surface on the image side and having at least one aspherical surface. An aperture diaphragm is disposed between the second lens and the third lens, and the imaging lens satisfies following conditional expressions:

$$0<|f2/f3|<0.49 \tag{1}$$

$$1.5<v3/v2 \tag{2}$$

$$0.5 < |f1/f23| < 3.0 \quad (3)$$

$$N1 < 1.80 \quad (5)$$

where f1, f2, and f3 are focal lengths of the first lens, the second lens and the third lens, respectively, ν2, and ν3 are Abbe numbers of the second lens and the third lens, respectively N1 is a refractive index of the first lens at the d-line, and f23 is a composite focal length of the second and third lenses.

In the imaging lens, an object-side surface of the first lens may be a convex surface.

The imaging lens may satisfy:

$$R3/f < 1.0 \quad (6)$$

where R3 is a radius of curvature of the object-side surface of the second lens.

The imaging lens may satisfy:

$$D1/f < 1 \quad (7)$$

where D1 is the distance (center thickness) between the apex on the object side of the first lens and that on the image side, whereby the size of the imaging lens can be prevented from being increased.

Preferably, the imaging lens further satisfy:

$$0.5 < D1/f < 0.8 \quad (8).$$

From the viewpoint of suppressing the increase of chromatic aberration, the imaging lens may satisfy:

$$2 < |R4/D3| < 6 \quad (9)$$

where R4 is the radius of curvature of the image-side surface of the second lens, and D3 is the center thickness of the second lens. Furthermore, the imaging lens may satisfy:

$$2.5 < |R4/D3| < 4.2 \quad (10).$$

The imaging lens satisfy:

$$1.5 < (D1+D3+D6)/f < 4 \quad (11)$$

where D6 is the center thickness of the third lens, and further may satisfy:

$$2 < (D1+D3+D6)/f < 3 \quad (12).$$

When exceeding the upper limit of the formula (11), the back focus is shortened or the lens is increased in size. When being below the lower limit of the formula (11), the focal length is shortened, and the angle is hardly broadened.

According to an aspect of the invention, there is provided a camera apparatus including the imaging lens as above-mentioned, and a solid-state imaging device which converts an optical image formed by the imaging lens to an electric signal.

BRIEF DESCRIPTION OF THE DRAWINGS

The features of the invention will appear more fully upon consideration of the exemplary embodiment of the invention, which are schematically set forth in the drawings, in which:

Figure 9:
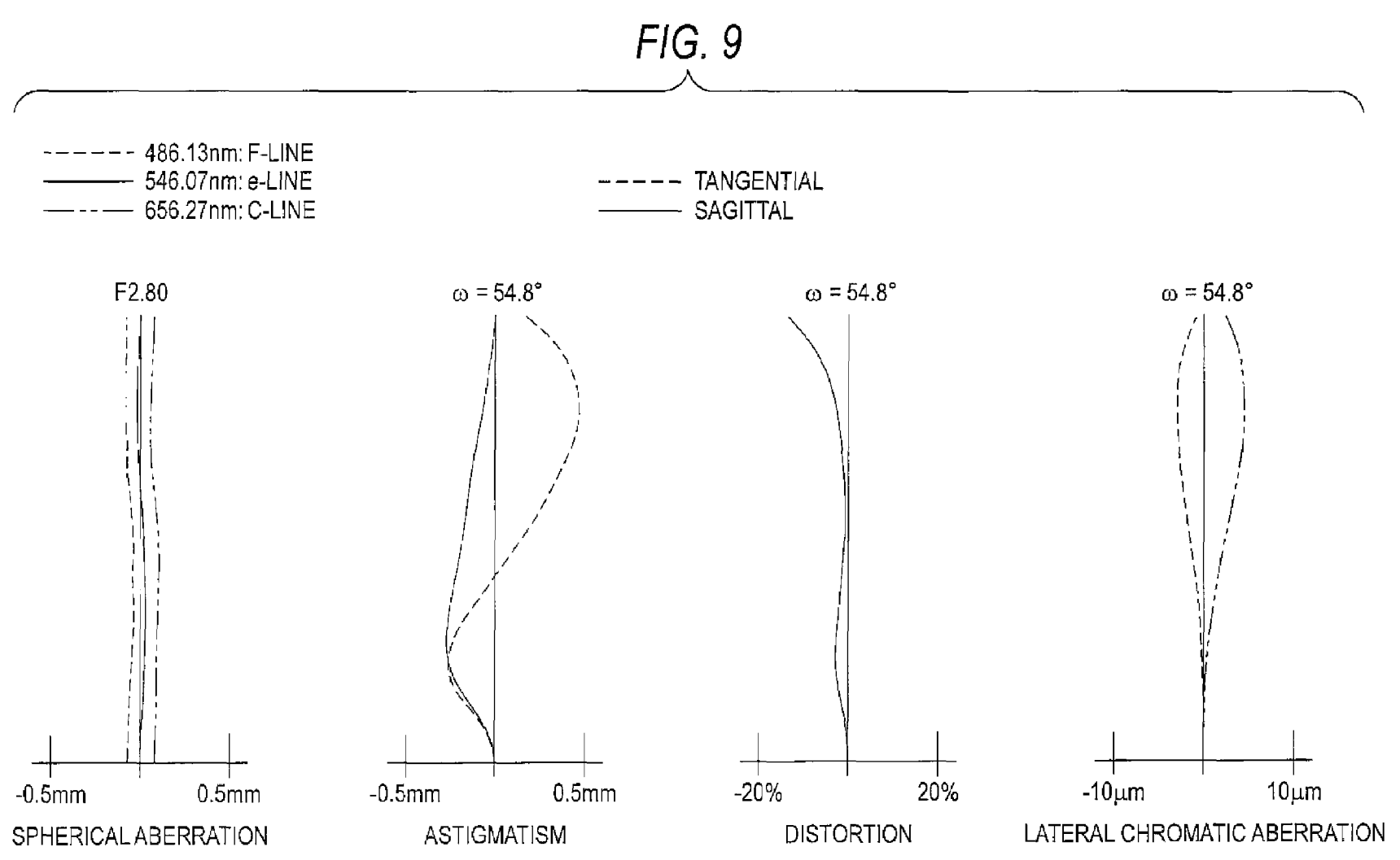

FIG. 9 is an aberration diagram of Example 4;

DETAILED DESCRIPTION OF THE EXEMPLARY EMBODIMENTS

Although the invention will be described below with reference to exemplary embodiments thereof, the following exemplary embodiments and modifications do not restrict the invention.

According to an exemplary embodiment of the invention, it is possible to realize an imaging lens which has the F-number of 2.8, and hence is bright, in which curvature of field is sufficiently corrected, and a wide field angle of a diagonal field angle of 90 degree or more is obtained, which is suitable for use in a vehicle camera, a surveillance camera, or the like, and which has a reduced size and high performance.

Figure 14:
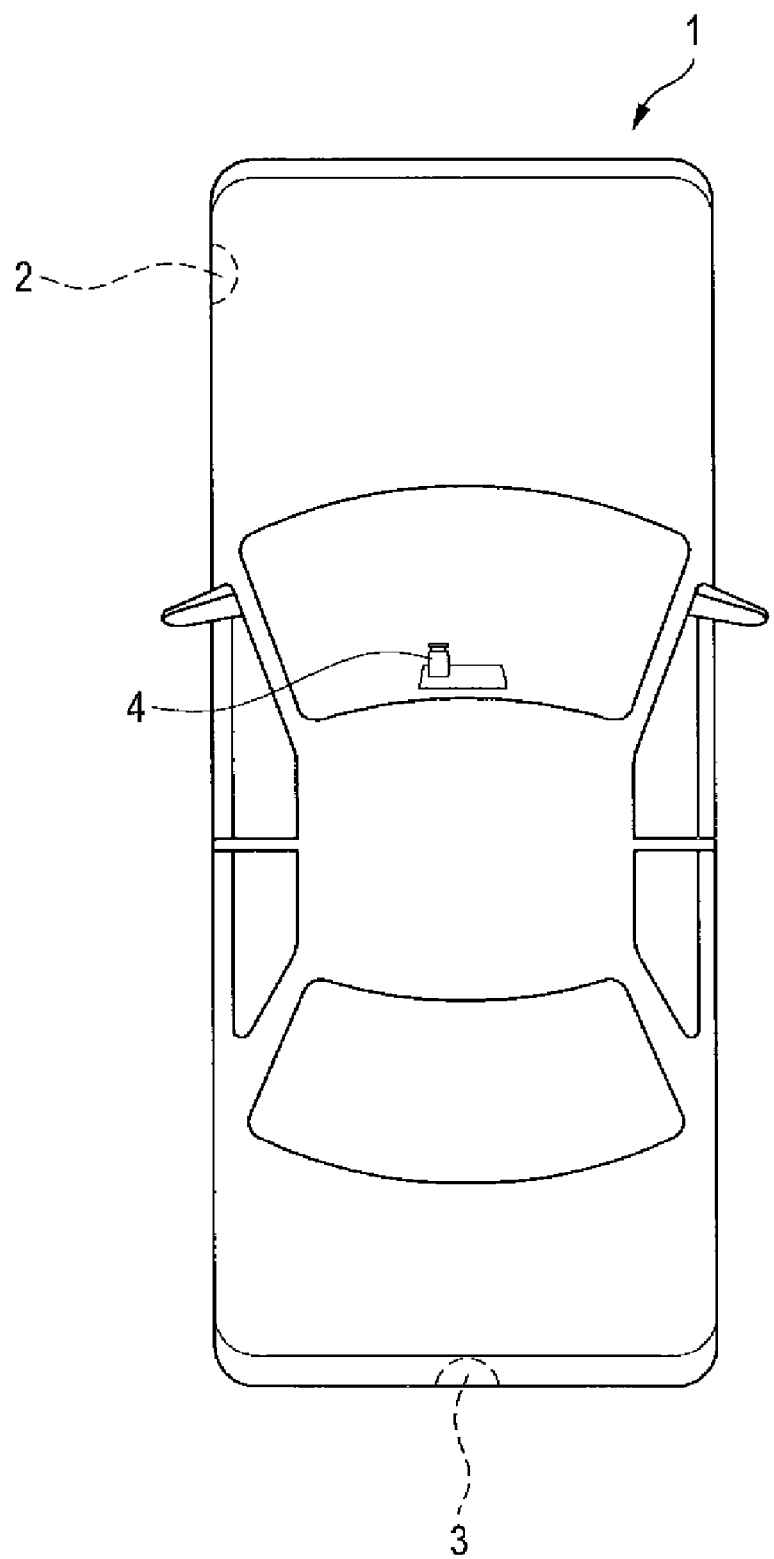
FIG. 14 is a diagram showing vehicle cameras.

Referring to FIG. 14, a vehicle 1 includes: an out-vehicle camera 2 for imaging a blind zone in the lateral side on the passenger side; an out-vehicle camera 3 for imaging a blind zone in rear of the vehicle 1; and an in-vehicle camera 4 attached to the rear side of a rear-view mirror, and for imaging a field of view identical with the driver's vision field. Each of the out-vehicle camera 2, the out-vehicle camera 3, and the in-vehicle camera 4 comprises an imaging lens 10, and a solid-state imaging device S1 configured by a CCD image sensor. Hereinafter, examples of the imaging lens 10 will be described.

Example 1

Figure 1:
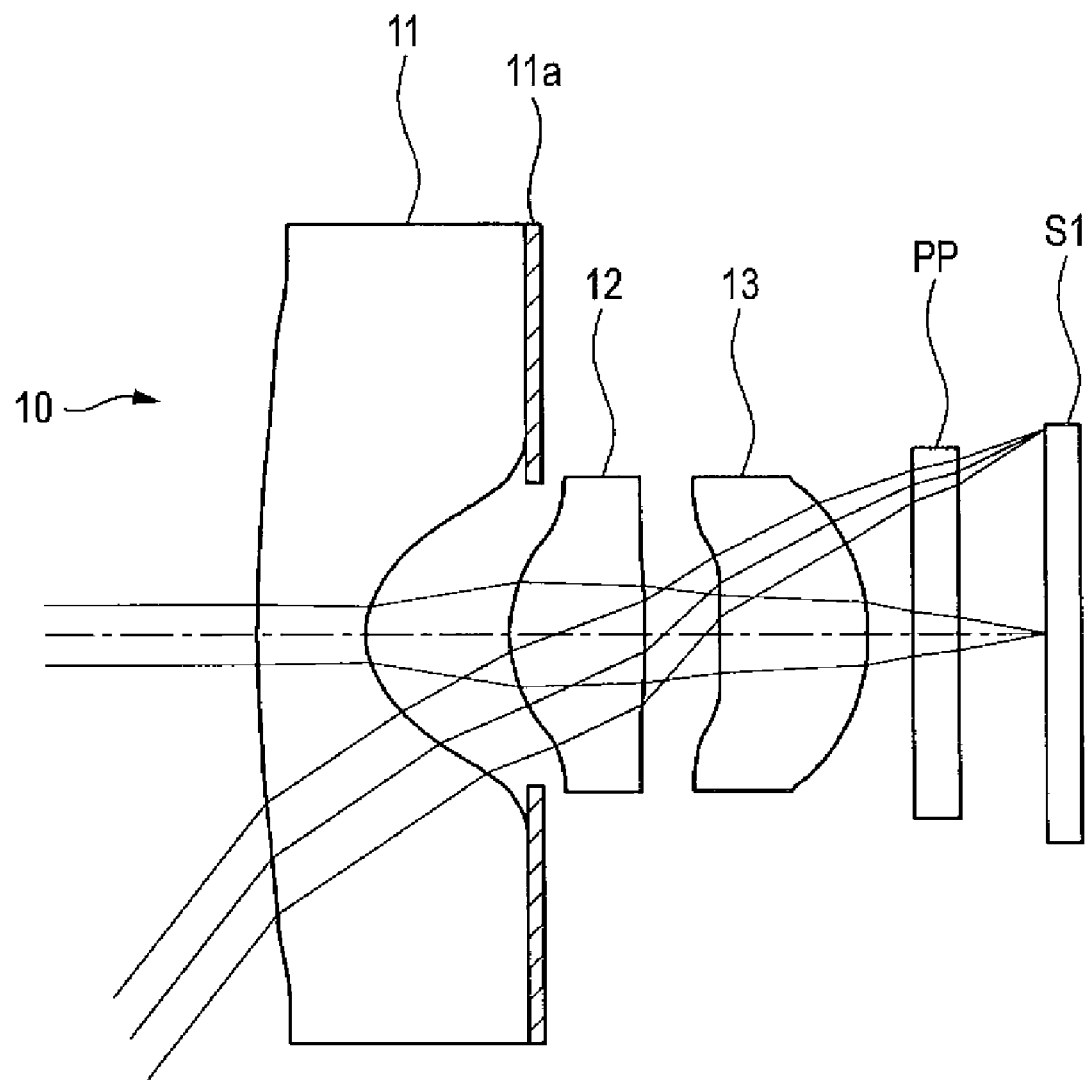
FIG. 1 is an optical path diagram of Example 1.
Figure 2:
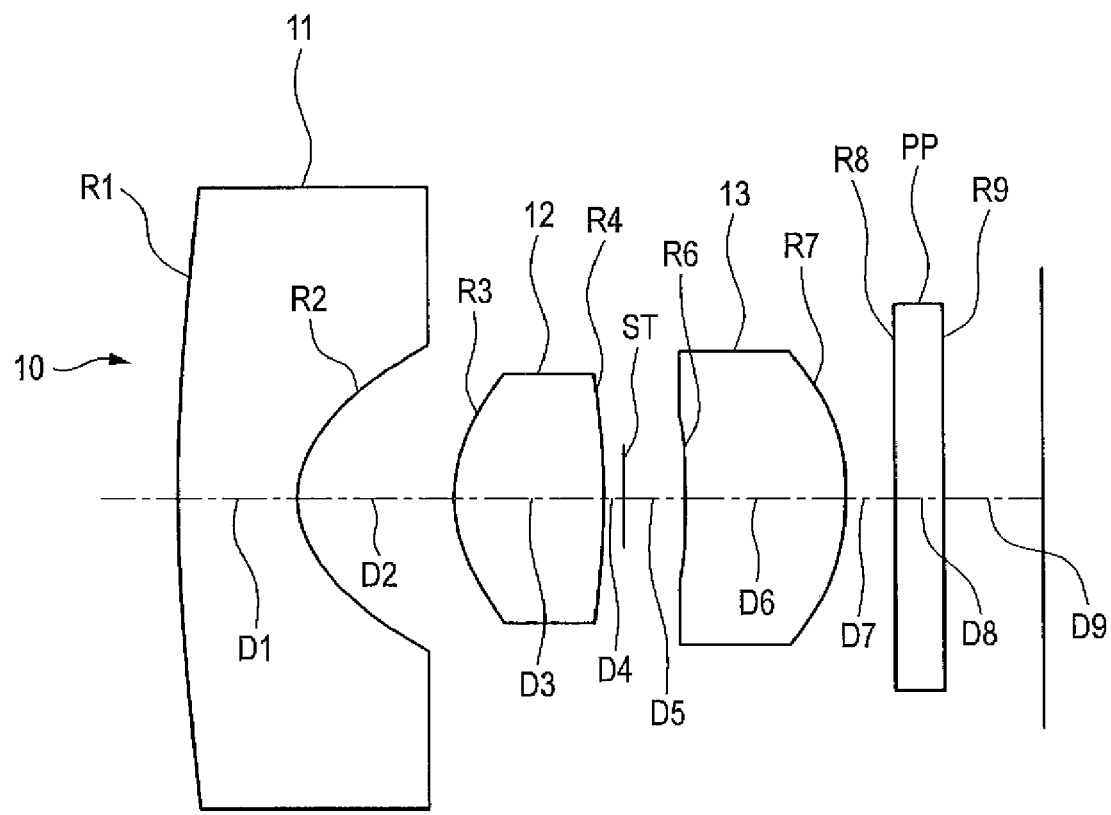
FIG. 2 is a section view showing the lens configuration of Example 1.
Figure 3:
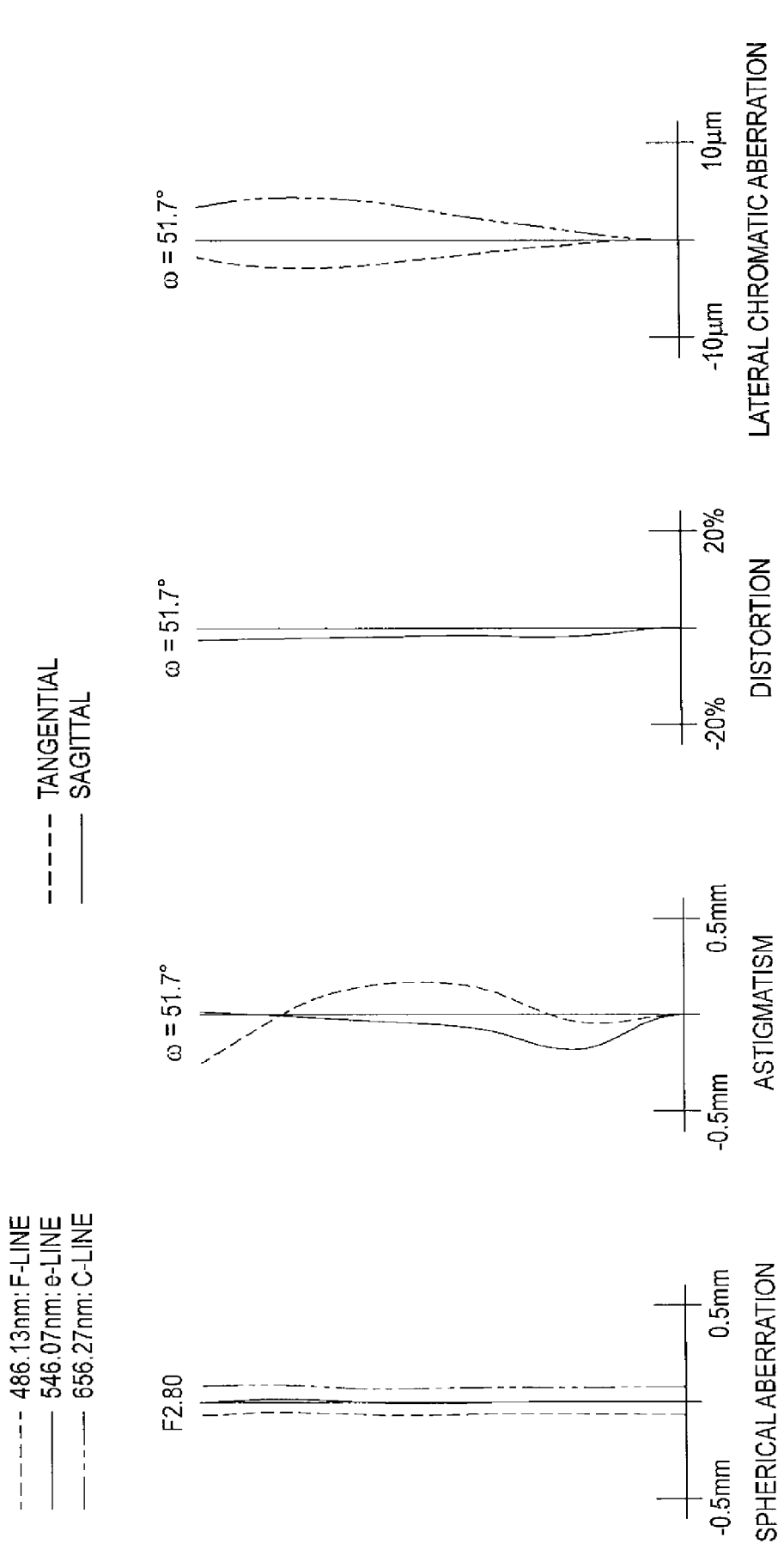
FIG. 3 is an aberration diagram of Example 1.

Referring to FIGS. 1 and 2, the imaging lens 10 includes sequentially from the object side a first lens 11, a second lens 12, and a third lens 13. Each of the first to third lenses 11 to 13 is configured by a bi-aspherical plastic lens having aspherical surfaces which are rotationally symmetric about the optical axis. The first lens 11 has a negative refractive power and has a meniscus shape where a convex surface is on the object side, a concave surface is on the image side, and the absolute value of the radius of curvature of the image-side surface is smaller than that of the object-side surface. A light shielding film 11a is disposed on a region outside the image-side concave surface of the first lens 11. The light shielding film 11a prevents light from entering from the outside of the effective diameter, and a ghost image from appearing on the image plane. The light shielding film 11a is a layer of an opaque coating composition which is disposed outside the effective diameter of the first lens 11. Alternatively, an opaque plate member may be disposed on the rear surface of the first lens 11. The light shielding film 11a is not restricted to be disposed in rear of the first lens 11, and may be disposed between other lenses depending on the occasion.

The second lens 12 has a bi-convex shape where each of the object-side and image-side surfaces is a convex surface, and the absolute value of the radius of curvature of the object side surface is smaller than that of the image-side surface. The third lens 13 has a positive meniscus shape where a concave surface is on the object side, a convex surface is on the image side, and the absolute value of the radius of curvature of the image-side convex surface is smaller than that of the object-side surface. An aperture diaphragm ST is disposed between the second lens 12 and the third lens 13. A light receiving surface of the solid-state imaging device S1 such as a CCD image sensor or a CMOS image sensor is positioned in the image plane. A cover glass for the solid-state imaging device S1, and filters such as an infrared blocking filter are disposed as a plane parallel plate PP between the third lens 13 and the image surface. Table 1 below shows lens data of the imaging lens 10, Table 2 shows aspherical coefficients of the first to third lenses 11 to 13, and Table 3 shows design specification of the imaging lens 10. The aspherical surfaces, and also those of the other examples are based on the following aspherical expression where KA is a conical constant of an aspherical surface, Bi is an i-th order aspherical coefficient, C is the reciprocal of a paraxial radius of curvature, and Y is the height from the optical axis.

$$Z = \frac{CY^2}{1 + \sqrt{1 - KA * C^2 Y^2}} + \sum B_i Y^i$$

$i = 3$ to $n$

TABLE 1

Example 1

| Surface Number | R | D | N | vd |
|---|---|---|---|---|
| 1 | 12.25 | 1.21 | 1.50869 | 56 |
| 2 | 0.88 | 1.60 | | |
| 3 | 1.52 | 1.50 | 1.58362 | 30.2 |
| 4 | −6.00 | 0.20 | | |
| ST 5 | 0.00 | 0.62 | | |
| 6 | −60.80 | 1.63 | 1.50869 | 56 |
| 7 | −2.30 | 0.50 | | |
| 8 | 0.00 | 0.50 | 1.5168 | 64.2 |
| 9 | 0.00 | 0.99 | | |
| Image | 0.00 | 0.00 | | |

TABLE 2

Aspherical Coefficent

| Surface Number | KA | B3 | B4 | B5 | B6 | B7 |
|---|---|---|---|---|---|---|
| 1 | −6.71E+02 | 3.75E−02 | −3.15E−02 | 3.76E−03 | 6.79E−03 | −3.28E−03 |
| 2 | 1.09E−01 | −2.72E−02 | 1.43E−02 | −2.51E−02 | 5.94E−03 | 3.20E−03 |
| 3 | 2.35E−01 | 4.33E−03 | 1.13E−03 | −7.67E−03 | −9.19E−03 | 1.63E−02 |
| 4 | −1.95E+04 | −1.72E−01 | 1.78E−01 | 7.44E−02 | −9.49E−02 | −8.44E−02 |
| 6 | −8.61E+11 | 9.75E−02 | −3.44E−01 | 9.38E−02 | 1.47E−01 | 1.79E−01 |
| 7 | −7.28E+01 | −2.84E−01 | 1.72E−01 | −4.37E−02 | 1.21E−02 | −2.23E−02 |

| Surface Number | B8 | B9 | B10 | B11 | B12 | B13 |
|---|---|---|---|---|---|---|
| 1 | 4.39E−04 | 3.17E−05 | −8.52E−06 | −1.36E−08 | −1.37E−08 | −5.79E−09 |
| 2 | −2.08E−04 | 4.82E−03 | −1.34E−03 | 6.59E−04 | 2.79E−05 | −1.40E−04 |
| 3 | 4.98E−03 | −1.05E−02 | −8.12E−04 | 1.08E−03 | 1.11E−04 | −4.51E−04 |
| 4 | −2.79E−02 | −2.43E−01 | 1.63E−01 | 1.49E−01 | 1.67E−01 | 9.59E−02 |
| 6 | −1.54E−01 | −4.57E−01 | 3.08E−01 | −1.04E−01 | −1.33E−01 | −7.82E−02 |
| 7 | 6.12E−03 | 5.48E−03 | −3.44E−03 | 4.53E−04 | 1.72E−04 | 1.43E−04 |

| Surface Number | B14 | B15 | B16 | B17 | B18 | B19 | B20 |
|---|---|---|---|---|---|---|---|
| 1 | −1.73E−09 | −2.89E−10 | 6.39E−11 | −1.70E−11 | −1.39E−12 | 1.76E−12 | 1.60E−12 |
| 2 | −1.73E−04 | −1.42E−04 | −9.67E−05 | −3.24E−05 | −6.85E−06 | 9.29E−06 | 1.82E−05 |
| 3 | −5.82E−04 | −3.81E−04 | 2.85E−05 | −1.62E−04 | −3.19E−05 | 6.82E−05 | 1.29E−04 |
| 4 | −1.57E−02 | −1.69E−01 | −2.25E−01 | −1.57E−01 | 2.57E−01 | 2.80E−01 | −1.81E−01 |
| 6 | 1.41E−01 | 4.33E−01 | 7.66E−01 | −1.80E−01 | −1.08E+00 | −1.29E+00 | 1.51E+00 |
| 7 | −2.90E−05 | −1.11E−04 | −1.24E−04 | 2.69E−05 | 2.09E−05 | 1.03E−05 | −1.10E−06 |

TABLE 3

| | |
|---|---|
| f | 1.82 |
| f1 | −1.93 |
| f2 | 2.22 |
| f3 | 4.64 |
| f23 | 2.50 |
| 2ω | 103.4 |
| L(in Air) | 8.57 |
| Fno | 2.8 |

In the tables, R indicates the radius of curvature of a spherical surface of a lens element, or the curvature of a reference surface of an aspherical surface, D indicates the surface separation or the air space, N indicates the refractive index at the d-line (wavelength =587.6 mm), and ν indicates the Abbe number at the d-line. In the tables, f indicates the focal length (mm) of the whole system, f1 indicates the focal length (mm) of the first lens 11, f2 indicates the focal length (mm) of the second lens 12, f3 indicates the focal length (mm) of the third lens 13, f23 indicates the composite focal length (mm) of the second lens 12 and the third lens 13, 2ω indicates the diagonal field angle (°), L indicates the distance (mm) between the apex of the object-side surface and the image surface, and Fno indicates the F-number. These are similarly applicable also to the other examples which will be described later.

In the imaging lens 10, |f2/f3|=0.48, and $$0<|f2/f3|<0.49 \quad (1)$$

is satisfied. Moreover, ν3/ν2=1.85, and $$1.5<\nu 3/\nu 2 \quad (2)$$

is satisfied. Moreover, |f1/f23|=0.77, and $$0.5<|f1/f23|<3.0 \quad (3)$$

is satisfied. Moreover, L/f=4.70, and $$0<L/f<10.0 \quad (4)$$

is satisfied. Moreover, N1=1.51, and $$N1<1.80 \quad (5)$$

is satisfied. Moreover, R3/f=0.83, and $$R3/f<1.0 \quad (6)$$

is satisfied. Moreover, D1/f=0.66, and both expressions:

$$D1/f<1 \quad (7)$$

$$0.5<D1/f<0.8 \quad (8)$$

are satisfied. Moreover, R4/D3=−4.00, and both expressions:

$$2<|R4/D3|<6 \quad (9)$$

$$2.5<|R4/D3|<4.2 \quad (10)$$

are satisfied. Moreover, (D1+D3+D6)/f=2.38, and both expressions:

$$1.5<(D1+D3+D6)/f<4 \quad (11)$$

$$2<(D1+D3+D6)/f<3 \quad (12)$$

are satisfied.

Example 2

Figure 4:
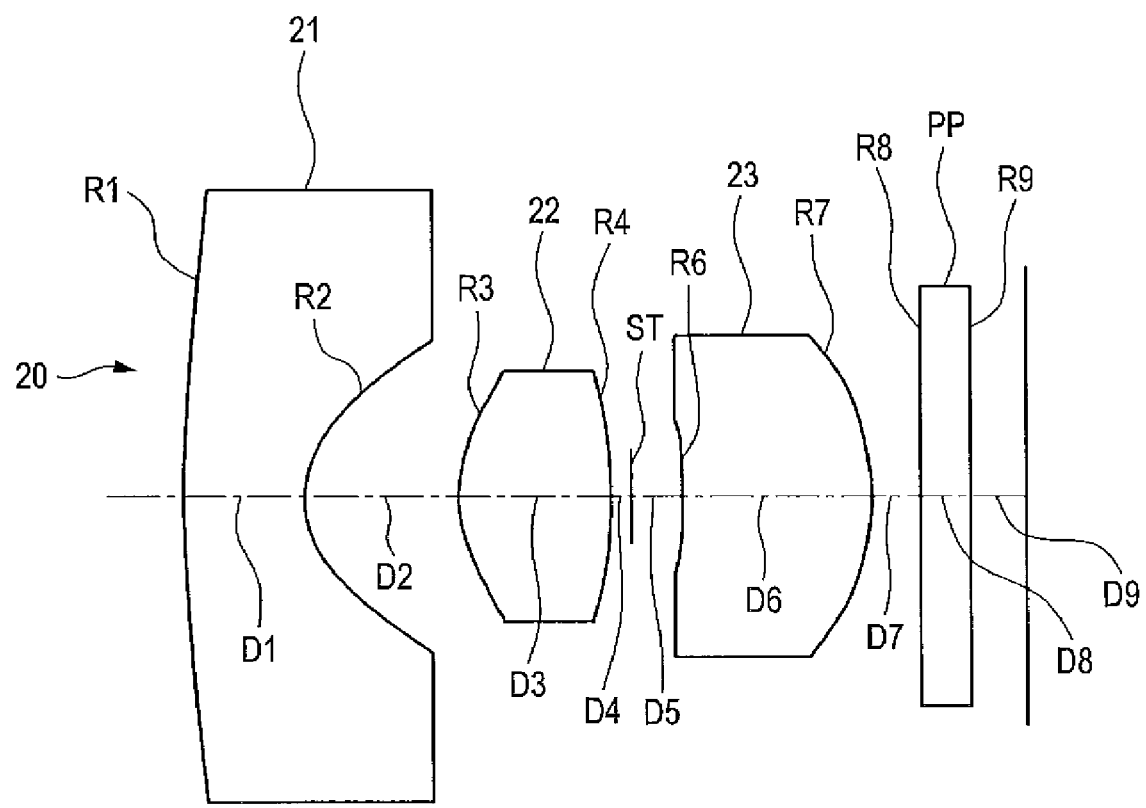
FIG. 4 is a section view showing the lens configuration of Example 2.
Figure 5:
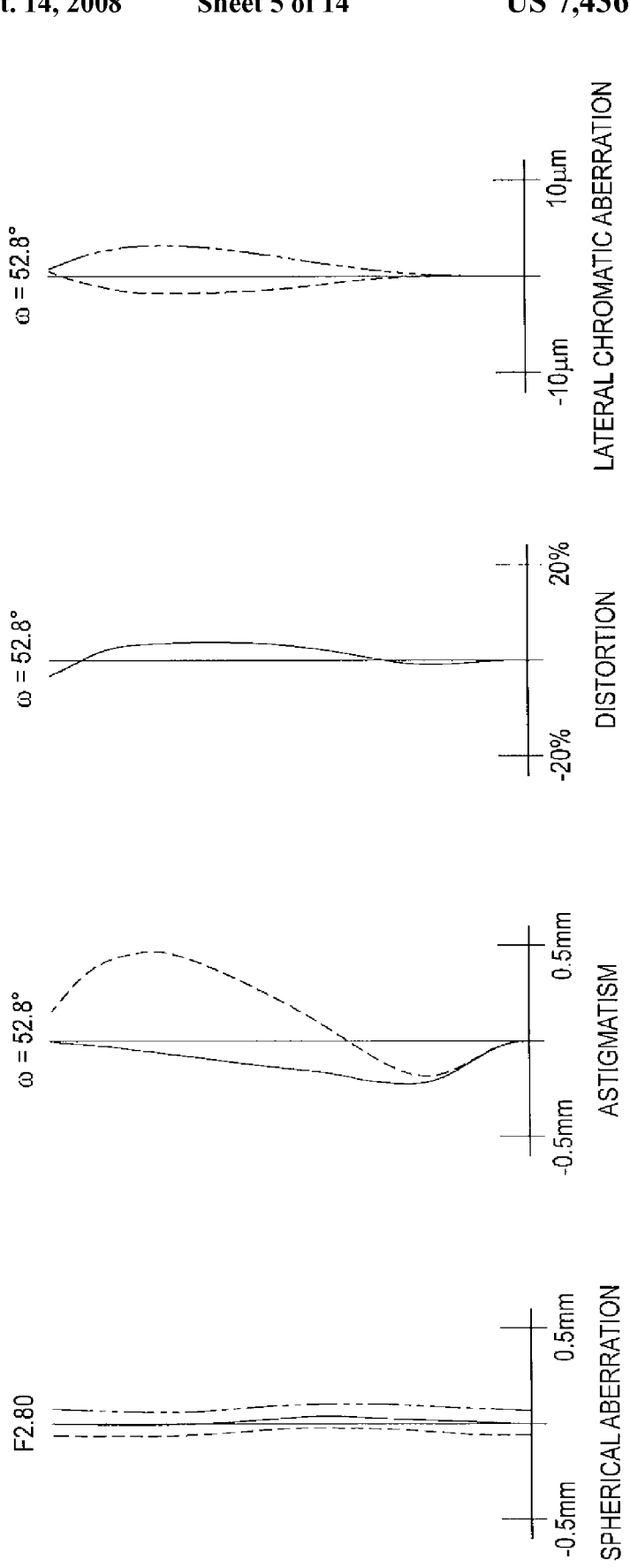
FIG. 5 is an aberration diagram of Example 2.

Referring to FIG. 4, an imaging lens 20 includes sequentially from the object side a first lens 21, a second lens 22, and a third lens 23. Each of the first to third lenses 21 to 23 is configured by a bi-aspherical plastic lens. The first lens 21 has a negative refractive power and has a meniscus shape where a convex surface is on the object side, a concave surface is on the image side, and the absolute value of the radius of curvature of the image-side concave surface is smaller than that of the object-side surface. The second lens 22 has a bi-convex shape where each of the object and image side surfaces is a convex surface, and the absolute value of the radius of curvature of the object-side surface is smaller than that of the image-side surface. The third lens 23 has a positive refractive power and has a meniscus shape where a concave surface is on the object side, a convex surface is on the image side, and the absolute value of the radius of curvature of the image-side convex surface is smaller than that of the object-side surface. An aperture diaphragm ST is disposed between the second lens 22 and the third lens 23. A plane parallel plate PP is disposed between the third lens 23 and the image plane. Table 4 shows lens data of the imaging lens 20, Table 5 shows aspherical coefficients of the surfaces, and Table 6 shows design specification of the imaging lens.

TABLE 4

| | Example 2 | | | |
|---|---|---|---|---|
| Surface Number | R | D | n | νd |
| 1 | 8.60 | 1.21 | 1.50869 | 56 |
| 2 | 0.88 | 1.55 | | |
| 3 | 1.52 | 1.52 | 1.58362 | 30.2 |
| 4 | −4.00 | 0.20 | | |
| ST 5 | 0.00 | 0.49 | | |
| 6 | −60.80 | 1.91 | 1.50869 | 56 |
| 7 | −2.30 | 0.50 | | |
| 8 | 0.00 | 0.50 | 1.5168 | 64.2 |
| 9 | 0.00 | 0.55 | | |
| Image | 0.00 | 0.00 | | |

TABLE 5

| | Aspherical Coeffcient | | | | | |
|---|---|---|---|---|---|---|
| Surface Number | KA | B3 | B4 | B5 | B6 | B7 |
| 1 | −7.27E+02 | 4.05E−02 | −3.17E−02 | 3.64E−03 | 6.77E−03 | −3.29E−03 |
| 2 | 8.49E−02 | −4.70E−02 | 4.72E−03 | −1.63E−02 | 7.32E−03 | 1.86E−03 |
| 3 | 3.35E−02 | 1.54E−02 | −7.06E−03 | −2.26E−02 | −6.73E−03 | 1.83E−02 |
| 4 | −2.78E+03 | −1.88E−01 | 1.03E−01 | 2.33E−02 | −5.42E−02 | 2.54E−02 |

TABLE 5-continued

| | Aspherical Coeffcient | | | | | |
|---|---|---|---|---|---|---|
| 6 | −8.61E+11 | 1.05E−01 | −3.25E−01 | 4.45E−02 | 3.82E−02 | 1.25E−01 |
| 7 | −7.77E+01 | −2.92E−01 | 2.05E−01 | −2.91E−02 | 7.97E−03 | −2.78E−02 |

| Surface Number | B8 | B9 | B10 | B11 | B12 | B13 |
|---|---|---|---|---|---|---|
| 1 | 4.39E−04 | 3.17E−05 | −8.53E−06 | −1.37E−08 | −1.31E−08 | −5.29E−09 |
| 2 | −1.63E−03 | 4.03E−03 | −1.64E−03 | 6.00E−04 | 1.30E−04 | −1.97E−05 |
| 3 | 5.31E−03 | −1.11E−02 | −1.57E−03 | 6.43E−04 | −5.58E−07 | −3.45E−04 |
| 4 | 7.51E−02 | −2.16E−01 | 9.19E−02 | 1.01E−02 | 1.63E−02 | −1.12E−03 |
| 6 | −6.03E−02 | −2.63E−01 | 5.09E−01 | −1.68E−02 | −4.38E−01 | −5.85E−01 |
| 7 | 3.27E−03 | 4.49E−03 | −3.34E−03 | 8.17E−04 | 5.37E−04 | 3.00E−04 |

| Surface Number | B14 | B15 | B16 | B17 | B18 | B19 | B20 |
|---|---|---|---|---|---|---|---|
| 1 | −1.45E−09 | −1.66E−10 | 1.08E−10 | −5.04E−12 | −1.44E−14 | 6.33E−13 | 4.57E−13 |
| 2 | −7.85E−05 | −7.75E−05 | −5.96E−05 | −1.65E−05 | −5.32E−06 | 2.09E−06 | 6.45E−06 |
| 3 | −4.08E−04 | −2.40E−04 | 7.93E−05 | −1.89E−04 | −9.67E−05 | 2.71E−05 | 1.62E−04 |
| 4 | −4.00E−03 | −4.39E−02 | −6.83E−03 | 1.82E−03 | 1.01E−01 | 9.96E−02 | −8.39E−02 |
| 6 | −4.37E−01 | 4.39E−02 | 8.64E−01 | 5.90E−01 | 2.67E−01 | −2.80E−01 | −3.64E−01 |
| 7 | 2.97E−05 | −7.69E−05 | −1.46E−04 | −3.05E−06 | −5.86E−07 | 3.00E−06 | 7.64E−06 |

TABLE 6

| f | 1.77 |
|---|---|
| f1 | −2.02 |
| f2 | 2.08 |
| f3 | 4.63 |
| f23 | 2.44 |
| 2ω | 105.6 |
| L(in Air) | 8.27 |
| Fno | 2.8 |

In the imaging lens 20, |f2/f3|=0.45, and $$0<|f2/f3|<0.49 \qquad (1)$$

is satisfied. Moreover, ν3/ν2=1.85, and $$1.5<\nu3/\nu2 \qquad (2)$$

is satisfied. Moreover, |f1/f23|=0.83, and $$0.5<|f1/f23|<3.0 \qquad (3)$$

is satisfied. Moreover, L/f=4.67, and $$0<L/f<10.0 \qquad (4)$$

is satisfied. Moreover, N1=1.51, and $$N1<1.80 \qquad (5)$$

is satisfied. Moreover, R3/f=0.86, and $$R3/f<1.0 \qquad (6)$$

is satisfied. Moreover, D1/f=0.68, and both expressions:

$$D1/f<1 \qquad (7)$$

$$0.5<D1/f<0.8 \qquad (8)$$

are satisfied. Moreover, R4/D3=−2.63, and both expressions:

$$2<|R4/D3|<6 \qquad (9)$$

$$2.5<|R4/D3|<4.2 \qquad (10)$$

are satisfied. Moreover, (D1+D3+D6)/f=2.62, and both expressions:

$$1.5<(D1+D3+D6)/f<4 \qquad (11)$$

$$2<(D1+D3+D6)/f<3 \qquad (12)$$

are satisfied.

Example 3

Figure 6:
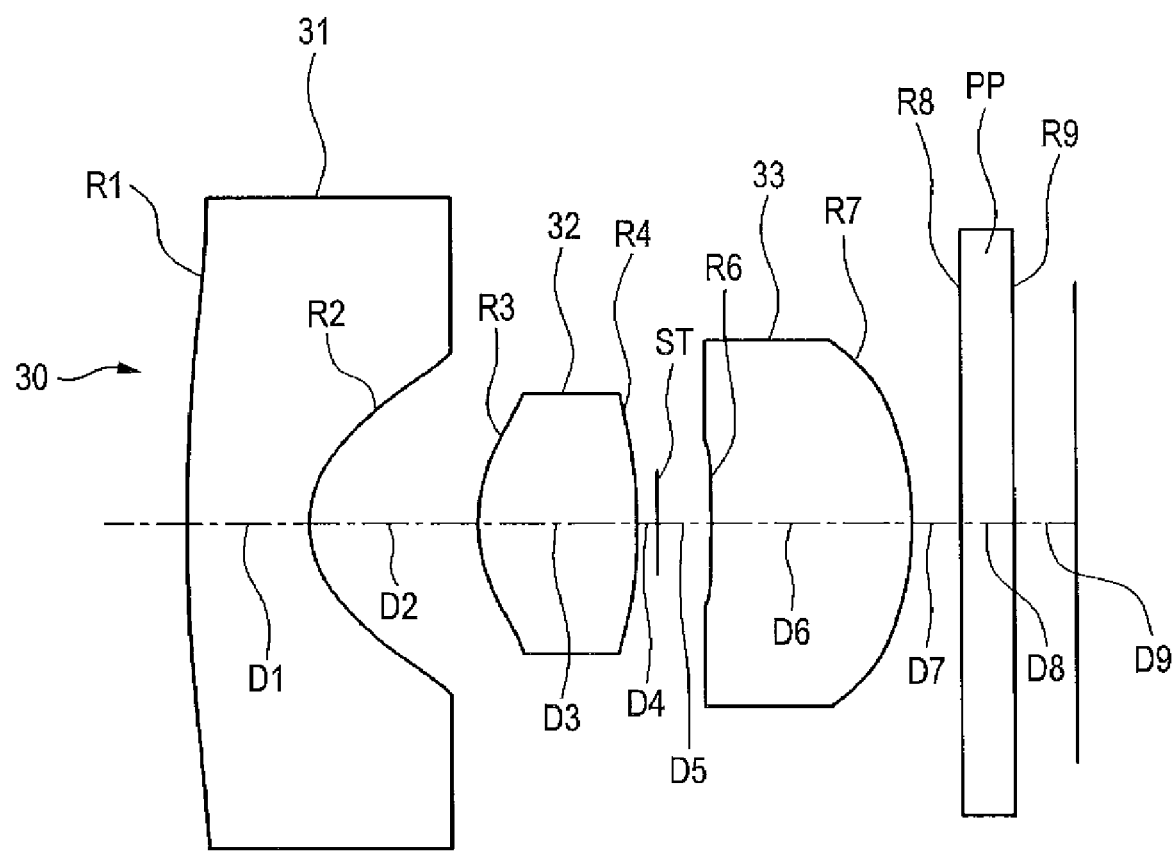
FIG. 6 is a section view showing the lens configuration of Example 3.
Figure 7:
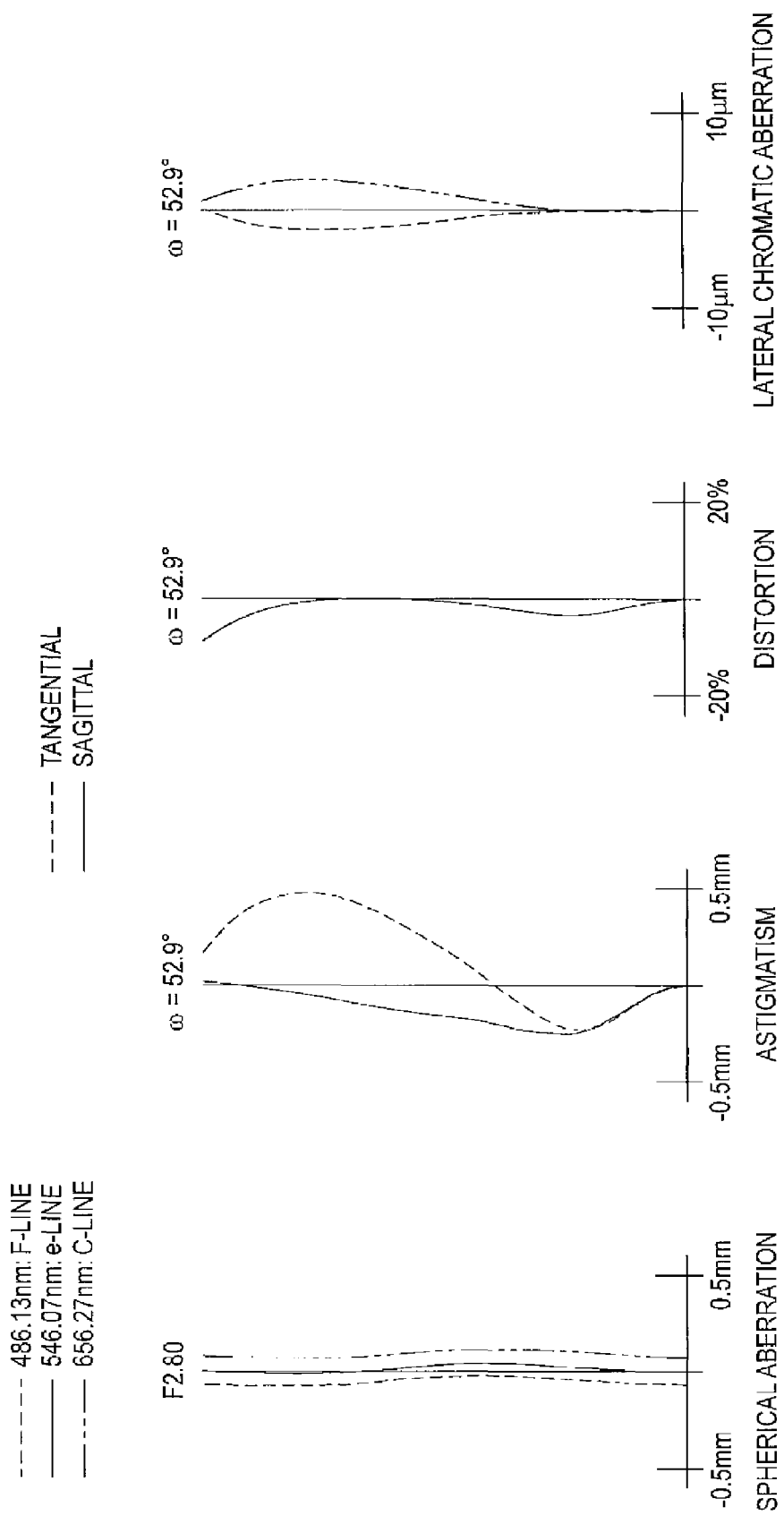
FIG. 7 is an aberration diagram of Example 3.

Referring to FIG. 6, an imaging lens 30 includes sequentially from the object side a first lens 31, a second lens 32, and a third lens 33. Each of the first to third lenses 31 to 33 is configured by a bi-aspherical plastic lens. The first lens 31 has a negative refractive power and a meniscus shape where a convex surface is on the object side, a concave surface is on the image side, and the absolute value of the radius of curvature of the image-side concave surface is smaller than that of the object-side convex surface. The second lens 32 has a bi-convex shape where each of the object and image side surfaces is a convex surface, and the absolute value of the radius of curvature of the object-side surface is smaller than that of the image-side surface. The third lens 33 has a positive refractive power and a meniscus shape where a concave surface is on the object side, a convex surface is on the image side, and the absolute value of the radius of curvature of the image-side convex surface is smaller than that of the object-side surface. An aperture diaphragm ST is disposed between the second lens 32 and the third lens 33. A plane parallel plate PP is disposed between the third lens 33 and the image plane. Table 7 shows lens data of the imaging lens 30, Table 8 shows aspherical coefficients of the surfaces, and Table 9 shows design specification of the imaging lens.

TABLE 7

| | Example 3 | | | |
|---|---|---|---|---|
| Surface Number | R | D | n | νd |
| 1 | 8.60 | 1.21 | 1.50869 | 58 |
| 2 | 0.88 | 1.62 | | |
| 3 | 1.52 | 1.52 | 1.58362 | 30.2 |
| 4 | −4.00 | 0.20 | | |
| ST 5 | 0.00 | 0.51 | | |

TABLE 7-continued

| | Example 3 | | | |
|---|---|---|---|---|
| Surface Number | R | D | n | vd |
| 6 | −60.80 | 1.92 | 1.50869 | 56 |
| 7 | −3.00 | 0.50 | | |
| 8 | 0.00 | 0.50 | 1.5168 | 64.2 |
| 9 | 0.00 | 0.59 | | |
| Image | 0.00 | 0.00 | | |

TABLE 8

| Aspherical Coefficient | | | | | | |
|---|---|---|---|---|---|---|
| Surface Number | KA | B3 | B4 | B5 | B6 | B7 |
| 1 | −9.02E+02 | 4.02E−02 | −3.17E−02 | 3.64E−03 | 6.77E−03 | −3.29E−03 |
| 2 | 8.69E−02 | −4.30E−02 | 5.67E−03 | −1.63E−02 | 7.25E−03 | 1.81E−03 |
| 3 | 3.22E−02 | 1.53E−02 | −7.12E−03 | −2.25E−02 | −6.56E−03 | 1.84E−02 |
| 4 | −2.71E+03 | −1.89E−01 | 1.03E−01 | 2.33E−02 | −5.43E−02 | 2.52E−02 |
| 6 | −8.61E+11 | 1.04E−01 | −3.26E−01 | 4.44E−02 | 4.05E−02 | 1.29E−01 |
| 7 | −1.19E+02 | −2.79E−01 | 2.06E−01 | −3.09E−02 | 7.08E−03 | −2.80E−02 |
| Surface Number | B8 | B9 | B10 | B11 | B12 | B13 |
| 1 | 4.38E−04 | 3.17E−05 | −8.53E−06 | −1.60E−08 | −1.37E−08 | −5.45E−09 |
| 2 | −1.66E−03 | 4.02E−03 | −1.65E−03 | 5.97E−04 | 1.27E−04 | −2.13E−05 |
| 3 | 5.37E−03 | −1.11E−02 | −1.57E−03 | 6.24E−04 | −2.55E−05 | −3.71E−04 |
| 4 | 7.49E−02 | −2.16E−01 | 9.14E−02 | 9.57E−03 | 1.57E−02 | −1.84E−03 |
| 6 | −5.72E−02 | −2.62E−01 | 5.07E−01 | −2.22E−02 | −4.47E−01 | −5.95E−01 |
| 7 | 3.24E−03 | 4.52E−03 | −3.30E−03 | 8.42E−04 | 5.52E−04 | 3.08E−04 |
| Surface Number | B14 | B15 | B16 | B17 | B18 | B19 | B20 |
| 1 | −1.49E−09 | −1.76E−10 | 1.06E−10 | −5.52E−12 | −7.41E−14 | 6.46E−13 | 4.72E−13 |
| 2 | −7.96E−05 | −7.83E−05 | −6.02E−05 | −1.70E−05 | −5.63E−06 | 1.87E−06 | 6.29E−06 |
| 3 | −4.30E−04 | −2.58E−04 | 6.56E−05 | −1.99E−04 | −1.03E−04 | 2.36E−05 | 1.61E−04 |
| 4 | −4.76E−03 | −4.46E−02 | −7.40E−03 | 1.58E−03 | 1.01E−01 | 1.00E−01 | −8.41E−02 |
| 6 | −4.49E−01 | 3.15E−02 | 8.53E−01 | 5.82E−01 | 2.65E−01 | −2.73E−01 | −3.44E−01 |
| 7 | 3.39E−05 | −7.51E−05 | −1.45E−04 | −3.04E−06 | −8.04E−07 | 2.73E−06 | 7.38E−06 |

TABLE 9

| | |
|---|---|
| f | 1.87 |
| f1 | −2.02 |
| f2 | 2.08 |
| f3 | 6.11 |
| f23 | 2.36 |
| 2ω | 105.7 |
| L(in Air) | 8.40 |
| Fno | 2.8 |

In the imaging lens 30, $|f2/f3|=0.34$, and $$0<|f2/f3|<0.49 \tag{1}$$

is satisfied. Moreover, $v3/v2=1.85$, and $$1.5<v3/v2 \tag{2}$$

is satisfied. Moreover, $|f1/f23|=0.86$, and $$0.5<|f1/f23|<3.0 \tag{3}$$

is satisfied. Moreover, $L/f=4.50$, and $$0<L/f<10.0 \tag{4}$$

is satisfied. Moreover, $N1=1.51$, and $$N1<1.80 \tag{5}$$

is satisfied. Moreover, $R3/f=0.81$, and $$R3/f<1.0 \tag{6}$$

is satisfied. Moreover, $D1/f=0.65$, and both expressions:

$$D1/f<1 \tag{7}$$

$$0.5<D1/f<0.8 \tag{8}$$

are satisfied. Moreover, $R4/D3=-2.62$, and both expressions:

$$2<|R4/D3|<6 \tag{9}$$

$$2.5<|R4/D3|<4.2 \tag{10}$$

are satisfied. Moreover, $(D1+D3+D6)/f=2.49$, and both expressions:

$$1.5<(D1+D3+D6)/f<4 \tag{11}$$

$$2<(D1+D3+D6)/f<3 \tag{12}$$

are satisfied.

Example 4

Figure 8:
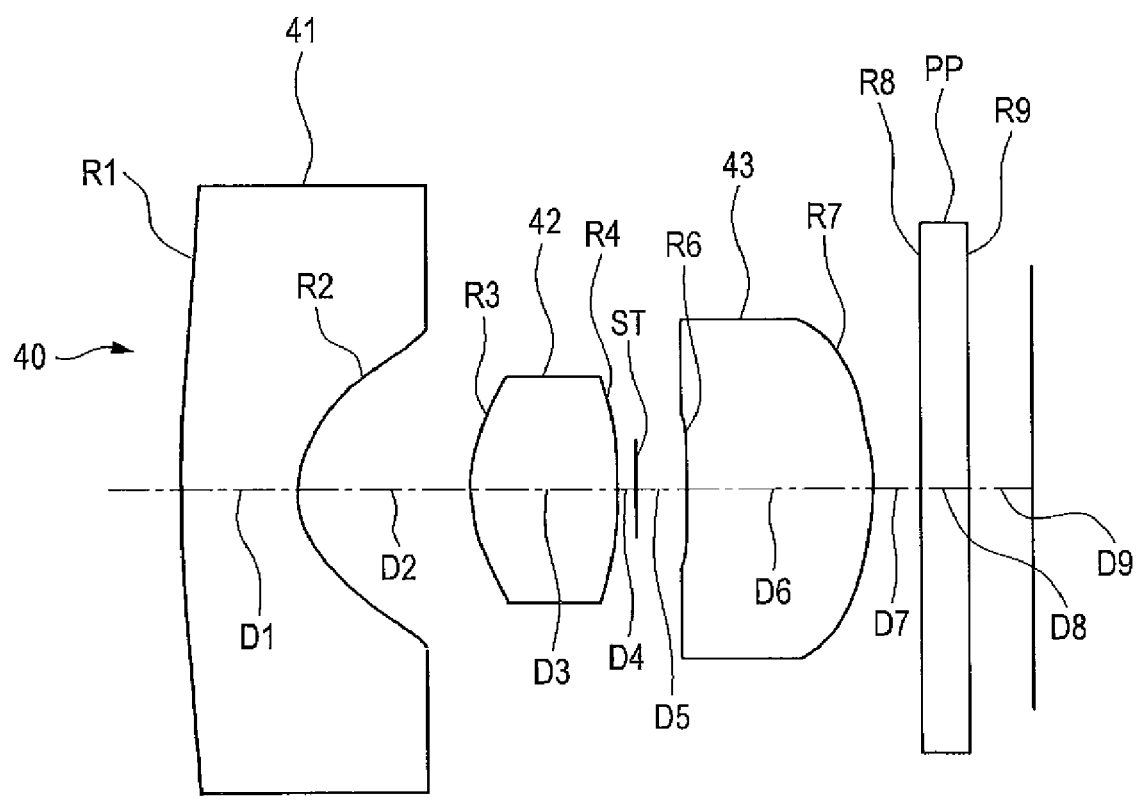
FIG. 8 is a section view showing the lens configuration of Example 4.

Referring to FIG. 8, an imaging lens 40 includes sequentially from the object side a first lens 41, a second lens 42, and a third lens 43. Each of the first to third lenses 41 to 43 is configured by a bi-aspherical plastic lens. The first lens 41 has a negative refractive power and a meniscus shape where a convex surface is on the object side, a concave surface is on the image side, and the absolute value of the radius of curvature of the image-side concave surface is smaller than that of the object-side surface. The second lens 42 has a bi-convex shape where each of the object and image side surfaces is a convex surface, and the absolute value of the radius of curvature of the object-side convex surface is smaller than that of the image-side surface. The third lens 43 has a positive refractive power and a meniscus shape where a concave surface is on the object side, a convex surface is on the image side, and the absolute value of the radius of curvature of the image-side convex surface is smaller than that of the object-side surface.

An aperture diaphragm ST is disposed between the second lens 42 and the third lens 43. A plane parallel plate PP is disposed between the third lens 43 and the image plane. Table 10 shows lens data of the imaging lens 40, Table 11 shows aspherical coefficients of the surfaces, and Table 12 shows design specification of the imaging lens.

TABLE 10

Example 4

| Surface Number | R | D | n | vd |
|---|---|---|---|---|
| 1 | 10.22 | 1.21 | 1.50869 | 56 |
| 2 | 0.93 | 1.81 | | |
| 3 | 1.63 | 1.52 | 1.58362 | 30.2 |
| 4 | −4.00 | 0.20 | | |
| ST 5 | 0.00 | 0.53 | | |
| 6 | −60.80 | 1.94 | 1.50869 | 56 |
| 7 | −3.10 | 0.50 | | |
| 8 | 0.00 | 0.50 | 1.5168 | 64.2 |
| 9 | 0.00 | 0.66 | | |
| Image | 0.00 | 0.00 | | |

TABLE 11

Aspherical Coefficient

| Surface Number | KA | B3 | B4 | B5 | B6 | B7 |
|---|---|---|---|---|---|---|
| 1 | −1.51E+03 | 3.97E−02 | −3.17E−02 | 3.64E−03 | 6.77E−03 | −3.29E−03 |
| 2 | 9.49E−02 | −3.42E−02 | 8.29E−03 | −1.60E−02 | 7.15E−03 | 1.71E−03 |
| 3 | 2.55E−02 | 1.54E−02 | −7.32E−03 | −2.25E−02 | −6.32E−03 | 1.86E−02 |
| 4 | −2.43E+03 | −1.91E−01 | 1.02E−01 | 2.34E−02 | −5.37E−02 | 2.55E−02 |
| 6 | −8.61E+11 | 1.06E−01 | −3.23E−01 | 4.83E−02 | 4.47E−02 | 1.32E−01 |
| 7 | −1.52E+02 | −2.69E−01 | 2.05E−01 | −3.34E−02 | 6.34E−03 | −2.80E−02 |

| Surface Number | B8 | B9 | B10 | B11 | B12 | B13 |
|---|---|---|---|---|---|---|
| 1 | 4.39E−04 | 3.17E−05 | −8.53E−06 | −1.57E−08 | −1.34E−08 | −5.33E−09 |
| 2 | −1.71E−03 | 3.99E−03 | −1.66E−03 | 5.94E−04 | 1.28E−04 | −1.98E−05 |
| 3 | 5.49E−03 | −1.11E−02 | −1.63E−03 | 5.40E−04 | −1.18E−04 | −4.57E−04 |
| 4 | 7.41E−02 | −2.19E−01 | 8.71E−02 | 3.51E−02 | 8.66E−03 | −8.75E−03 |
| 6 | −5.54E−02 | −2.61E−01 | 5.09E−01 | −1.69E−02 | −4.36E−01 | −5.79E−01 |
| 7 | 3.38E−03 | 4.63E−03 | −3.24E−03 | 8.75E−04 | 5.66E−04 | 3.13E−04 |

| Surface Number | B14 | B15 | B16 | B17 | B18 | B19 | B20 |
|---|---|---|---|---|---|---|---|
| 1 | −1.45E−09 | −1.58E−10 | 1.12E−10 | −3.90E−12 | 2.54E−13 | 6.47E−13 | 4.23E−13 |
| 2 | −7.80E−05 | −7.71E−05 | −5.92E−05 | −1.63E−05 | −5.15E−06 | 2.19E−06 | 6.50E−06 |
| 3 | −5.04E−04 | −3.18E−04 | 2.04E−05 | −2.32E−04 | −1.25E−04 | 9.63E−06 | 1.53E−04 |
| 4 | −9.68E−03 | −4.48E−02 | 3.74E−04 | 2.04E−04 | 1.31E−01 | 1.29E−01 | −1.12E−01 |
| 6 | −4.28E−01 | 5.40E−02 | 8.71E−01 | 5.87E−01 | 2.49E−01 | −3.18E−01 | −4.15E−01 |
| 7 | 3.49E−05 | −7.53E−05 | −1.46E−04 | −3.54E−06 | −1.13E−06 | 2.55E−06 | 7.31E−06 |

TABLE 12

| | |
|---|---|
| f | 1.84 |
| f1 | −2.10 |
| f2 | 2.19 |
| f3 | 6.32 |
| f23 | 2.44 |
| 2ω | 109.6 |
| L(in Air) | 8.69 |
| Fno | 2.8 |

In the imaging lens 40, $|f2/f3|=0.35$, and $$0<|f2/f3|<0.49 \quad (1)$$

is satisfied. Moreover, $v3/v2=1.85$, and $$1.5<v3/v2 \quad (2)$$

is satisfied. Moreover, $|f1/f23|=0.86$, and $$0.5<|f1/f23|<3.0 \quad (3)$$

is satisfied. Moreover, $L/f=4.73$, and $$0<L/f<10.0 \quad (4)$$

is satisfied. Moreover, $N1=1.51$, and $$N1<1.80 \quad (5)$$

is satisfied. Moreover, $R3/f=0.89$, and $$R3/f<1.0 \quad (6)$$

is satisfied. Moreover, $D1/f=0.66$, and both expressions:

$$D1/f<1 \quad (7)$$

$$0.5<D1/f<0.8 \quad (8)$$

are satisfied. Moreover, $R4/D3=-2.62$, and both expressions:

$$2<|R4/D3|<6 \quad (9)$$

$$2.5<|R4/D3|<4.2 \quad (10)$$

are satisfied. Moreover, $(D1+D3+D6)/f=2.55$, and both expressions:

$$1.5<(D1+D3+D6)/f<4 \quad (11)$$

$$2<(D1+D3+D6)/f<3 \quad (12)$$

are satisfied.

Example 5

Figure 10:
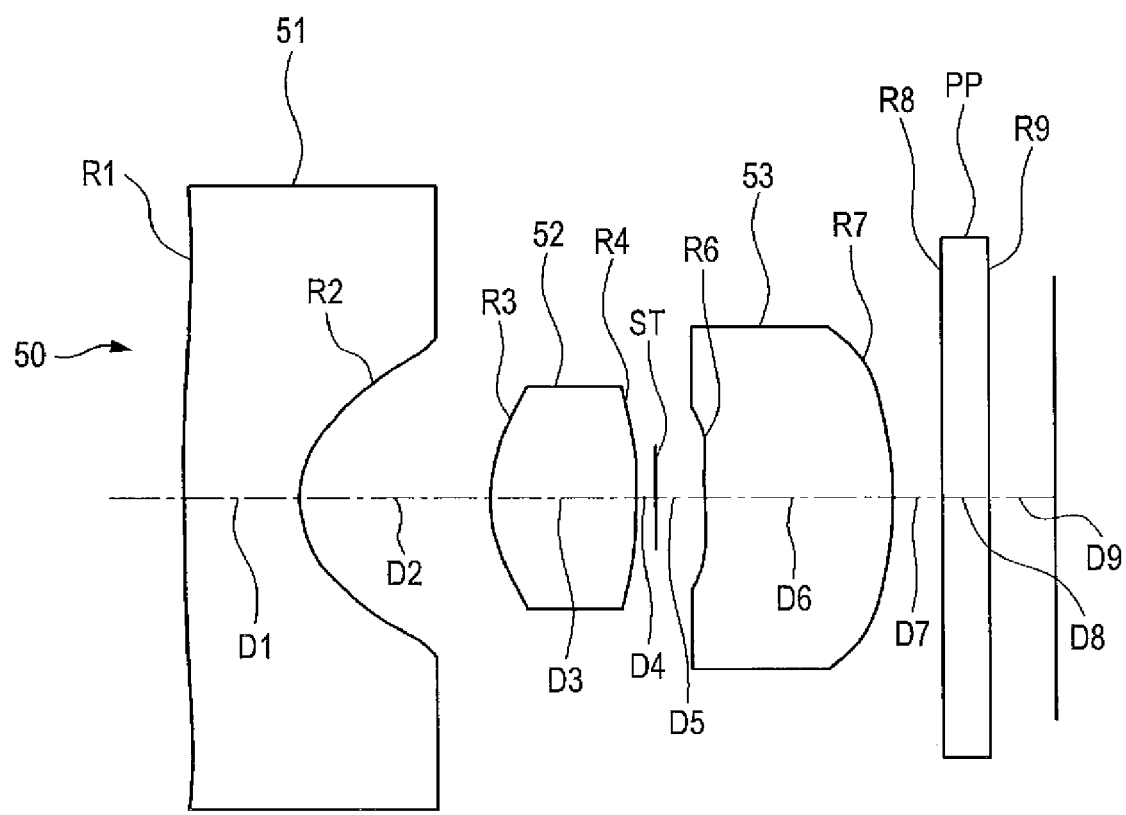
FIG. 10 is a section view showing the lens configuration of Example 5.
Figure 11:
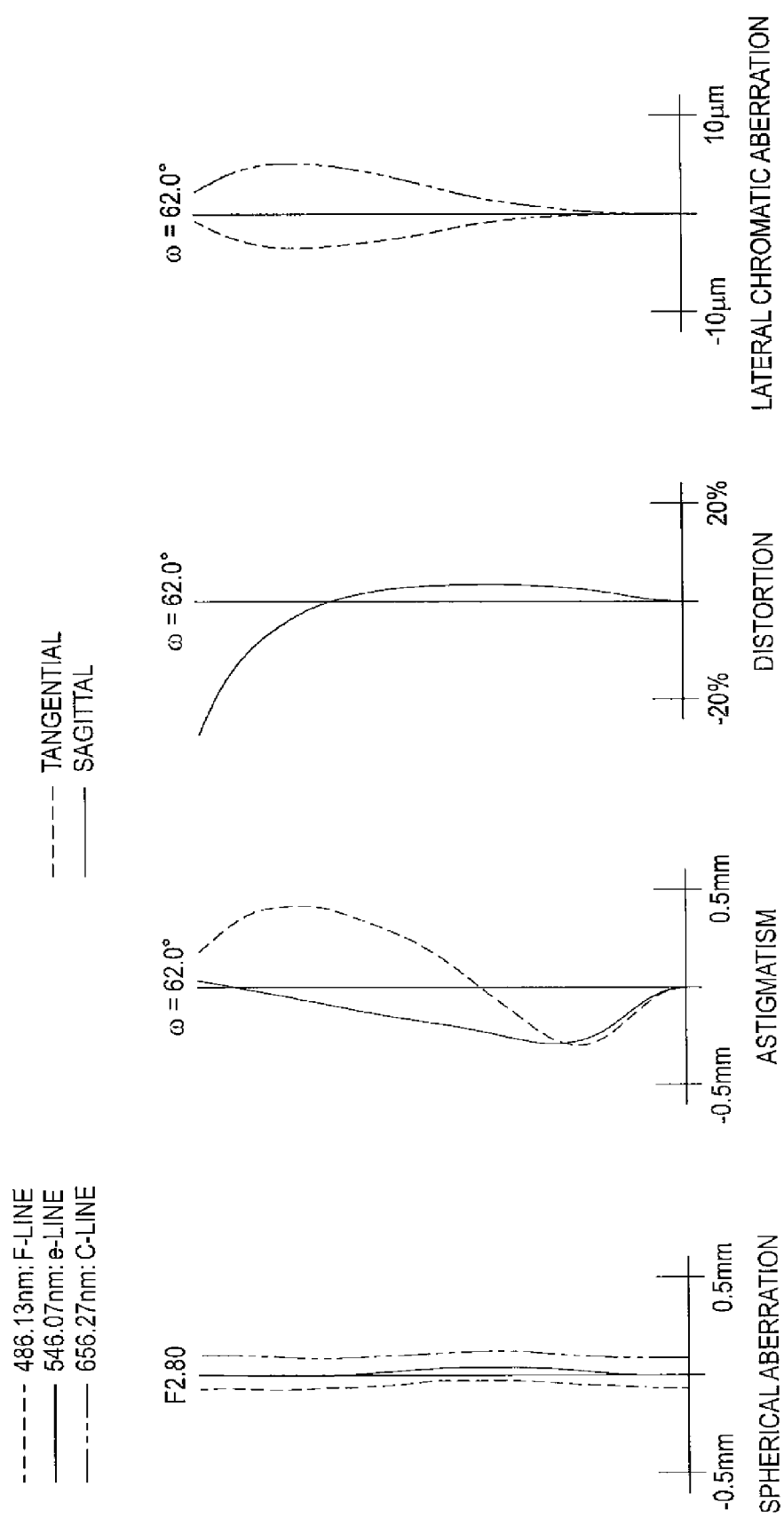
FIG. 11 is an aberration diagram of Example 5.

Referring to FIG. 10, an imaging lens 50 includes sequentially from the object side a first lens 51, a second lens 52, and a third lens 53. Each of the first to third lenses 51 to 53 is configured by a bi-aspherical plastic lens. The first lens 51 has a negative refractive power and has a meniscus shape where a convex surface is on the object side, and a concave surface is on the image side. The second lens 52 has a bi-convex shape where each of the object and image side surfaces is a convex surface, and the absolute value of the radius of curvature of the object-side convex surface is smaller than that of the image-side surface. The third lens 53 has a positive refractive power and a meniscus shape where a concave surface is on the object side, a convex surface is on the image side, and the absolute value of the radius of curvature of the image-side convex surface is smaller than that of the object-side surface. An aperture diaphragm ST is disposed between the second lens 52 and the third lens 53. A plane parallel plate PP is disposed between the third lens 53 and the image plane. Table 13 shows lens data of the imaging lens 50, Table 14 shows aspherical coefficients of the surfaces, and Table 15 shows design specification of the imaging lens.

TABLE 13

Example 5

| Surface Number | R | D | n | vd |
|---|---|---|---|---|
| 1 | 100.00 | 1.21 | 1.50869 | 56 |
| 2 | 0.93 | 1.98 | | |
| 3 | 1.63 | 1.53 | 1.58362 | 30.2 |
| 4 | −4.00 | 0.20 | | |
| ST 5 | 0.00 | 0.50 | | |
| 6 | −60.80 | 1.97 | 1.50869 | 56 |
| 7 | −3.44 | 0.50 | | |
| 8 | 0.00 | 0.50 | 1.5168 | 64.2 |
| 9 | 0.00 | 0.70 | | |
| Image | 0.00 | 0.00 | | |

TABLE 14

Aspherical Coefficient

| Surface Number | KA | B3 | B4 | B5 | B6 | B7 |
|---|---|---|---|---|---|---|
| 1 | −1.51E+03 | 3.97E−02 | −3.17E−02 | 3.64E−03 | 6.77E−03 | −3.29E−03 |
| 2 | 9.49E−02 | −3.42E−02 | 8.29E−03 | −1.60E−02 | 7.15E−03 | 1.71E−03 |
| 3 | 2.55E−02 | 1.54E−02 | −7.32E−03 | −2.25E−02 | −6.32E−03 | 1.86E−02 |
| 4 | −2.43E+03 | −1.91E−01 | 1.02E−01 | 2.34E−02 | −5.37E−02 | 2.55E−02 |
| 6 | −8.61E+11 | 1.06E−01 | −3.23E−01 | 4.83E−02 | 4.47E−02 | 1.32E−01 |
| 7 | −1.52E+02 | −2.69E−01 | 2.05E−01 | −3.34E−02 | 6.34E−03 | −2.80E−02 |

| Surface Number | B8 | B9 | B10 | B11 | B12 | B13 |
|---|---|---|---|---|---|---|
| 1 | 4.39E−04 | 3.17E−05 | −8.53E−06 | −1.57E−08 | −1.34E−08 | −5.33E−09 |
| 2 | −1.71E−03 | 3.99E−03 | −1.66E−03 | 5.94E−04 | 1.28E−04 | −1.98E−05 |
| 3 | 5.49E−03 | −1.11E−02 | −1.63E−03 | 5.40E−04 | −1.18E−04 | −4.57E−04 |
| 4 | 7.41E−02 | −2.19E−01 | 8.71E−02 | 3.51E−03 | 8.66E−03 | −8.75E−03 |
| 6 | −5.54E−02 | −2.61E−01 | 5.09E−01 | −1.69E−02 | −4.36E−01 | −5.79E−01 |
| 7 | 3.38E−03 | 4.63E−03 | −3.24E−03 | 8.75E−04 | 5.66E−04 | 3.13E−04 |

| Surface Number | B14 | B15 | B16 | B17 | B18 | B19 | B20 |
|---|---|---|---|---|---|---|---|
| 1 | −1.45E−09 | −1.58E−10 | 1.12E−10 | −3.90E−12 | 2.54E−13 | 6.47E−13 | 4.23E−13 |
| 2 | −7.80E−05 | −7.71E−05 | −5.92E−05 | −1.63E−05 | −5.15E−06 | 2.19E−06 | 6.50E−06 |
| 3 | −5.04E−04 | −3.18E−04 | 2.04E−05 | −2.32E−04 | −1.25E−04 | 9.63E−06 | 1.53E−04 |
| 4 | −9.68E−03 | −4.48E−02 | 3.74E−04 | 2.04E−02 | 1.31E−01 | 1.29E−01 | −1.12E−01 |
| 6 | −4.28E−01 | 5.40E−02 | 8.71E−01 | 5.87E−01 | 2.49E−01 | −3.18E−01 | −4.15E−01 |
| 7 | 3.49E−05 | −7.53E−05 | −1.46E−04 | −3.54E−06 | −1.13E−06 | 2.55E−06 | 7.31E−06 |

TABLE 15

| | |
|---|---|
| f | 1.65 |
| f1 | −1.85 |
| f2 | 2.19 |
| f3 | 7.06 |

TABLE 15-continued

| | |
|---|---|
| f23 | 2.41 |
| 2ω | 124 |
| L(in Air) | 8.92 |
| Fno | 2.8 |

In the imaging lens 50, $|f2/f3|=0.31$, and $$0<|f2/f3|<0.49 \quad (1)$$

is satisfied. Moreover, $v3/v2=1.85$, and $$1.5<v3/v2 \quad (2)$$

is satisfied. Moreover, $|f1/f23|=0.77$, and $$0.5<|f1/f23|<3.0 \quad (3)$$

is satisfied. Moreover, $L/f=5.40$, and $$0<L/f<10.0 \quad (4)$$

is satisfied. Moreover, $N1=1.51$, and $$N1<1.80 \quad (5)$$

is satisfied. Moreover, $R3/f=0.99$, and $$R3/f<1.0 \quad (6)$$

is satisfied. Moreover, $D1/f=0.73$, and both expressions:

$$D1/f<1 \quad (7)$$

$$0.5<D1/f<0.8 \quad (8)$$

are satisfied. Moreover, $R4/D3=-2.62$, and both expressions:

$$2<|R4/D3|<6 \quad (9)$$

$$2.5<|R4/D3|<4.2 \quad (10)$$

are satisfied. Moreover, $(D1+D3+D6)/f=2.85$, and both expressions:

$$1.5<(D1+D3+D6)/f<4 \quad (11)$$

$$2<(D1+D3+D6)/f<3 \quad (12)$$

are satisfied.

Example 6

Figure 12:
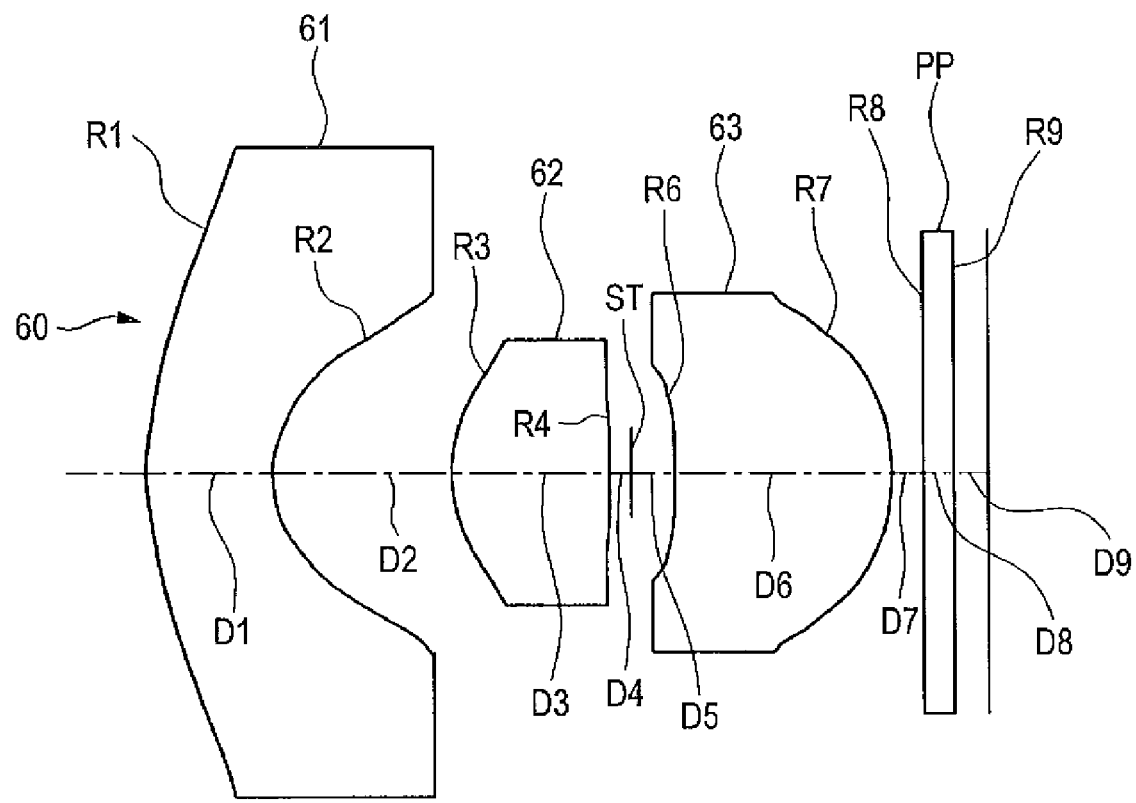
FIG. 12 is a section view showing the lens configuration of Example 6.
Figure 13:
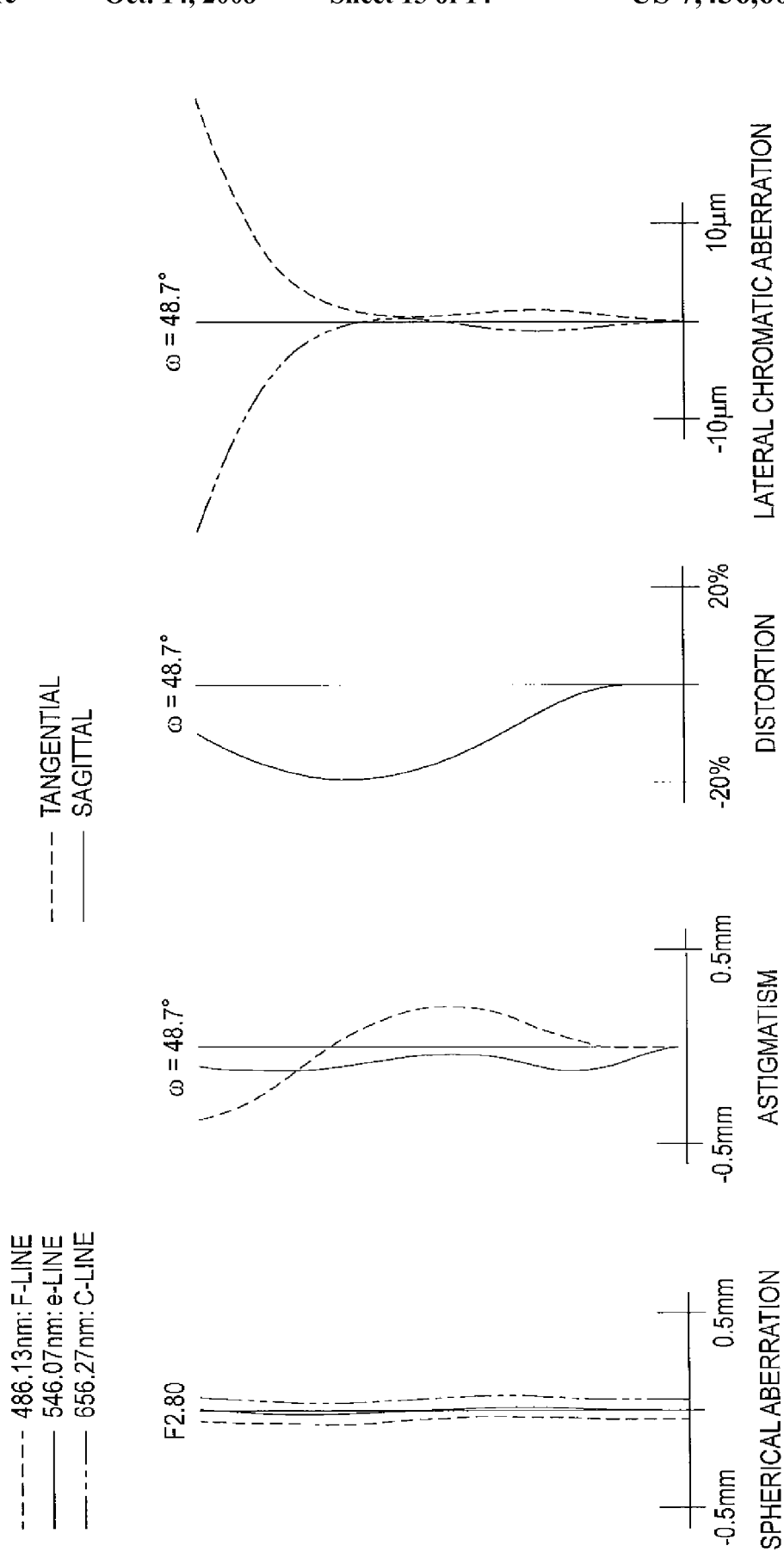
FIG. 13 is an aberration diagram of Example 6.

Referring to FIG. 12, an imaging lens 60 includes sequentially from the object side a first lens 61, a second lens 62, and a third lens 63. Each of the first to third lenses 61 to 63 is configured by a bi-aspherical plastic lens. The first lens 61 has a negative refractive power and has a meniscus shape where a convex surface is on the object side, and a concave surface is on the image side and the absolute value of the radius of curvature of the image-side concave surface is smaller than that of the object-side surface. The second lens 62 has a bi-convex shape where each of the object and image side surfaces, and the absolute value of the radius of curvature of the object-side convex surface is smaller than that of the image-side surface. The third lens 63 has a flat surface in the vicinity of the optical axis on the object side, and a convex surface on the image side. An aperture diaphragm ST is disposed between the second lens 62 and the third lens 63. A plane parallel plate PP is disposed between the third lens 63 and the image plane. Table 16 shows lens data of the imaging lens 60, Table 17 shows aspherical coefficients of the surfaces, and Table 18 shows design specification of the imaging lens.

TABLE 16

| | Example 6 | | | |
|---|---|---|---|---|
| Surface Number | R | D | n | vd |
| 1 | 3.00 | 1.20 | 1.50869 | 66 |
| 2 | 1.00 | 1.69 | | |
| 3 | 1.52 | 1.50 | 1.58362 | 30.2 |
| 4 | −5.00 | 0.20 | | |
| ST 5 | 0.00 | 0.40 | | |
| 6 | 0.00 | 2.06 | 1.50869 | 56 |
| 7 | −2.30 | 0.30 | | |
| 8 | 0.00 | 0.30 | 1.5168 | 64.2 |
| 9 | 0.00 | 0.31 | | |
| Image | 0.00 | 0.00 | | |

TABLE 17

| Aspherical Coefficient | | | | | | |
|---|---|---|---|---|---|---|
| Surface Number | KA | B3 | B4 | B5 | B6 | B7 |
| 1 | −8.73E+00 | 3.57E−02 | −3.16E−02 | 3.92E−03 | 6.84E−03 | −3.27E−03 |
| 2 | 1.52E−01 | −2.04E−02 | 2.64E−02 | −2.10E−02 | 8.12E−03 | 3.85E−03 |
| 3 | 4.91E−02 | 3.84E−02 | 7.24E−04 | −1.00E−02 | −1.31E−02 | 1.56E−02 |
| 4 | −7.90E+03 | −1.81E−01 | 1.69E−01 | 7.10E−02 | −9.73E−02 | −8.92E−02 |
| 6 | 0.00E+00 | 9.71E−02 | −4.20E−01 | 4.19E−02 | 1.40E−01 | 2.01E−01 |
| 7 | −1.01E+02 | −3.14E−01 | 1.40E−01 | −5.09E−02 | 1.20E−02 | −2.36E−02 |
| Surface Number | B8 | B9 | B10 | B11 | B12 | B13 |
| 1 | 4.41E−04 | 3.17E−05 | −8.63E−06 | −7.09E−08 | −3.99E−08 | −1.39E−08 |
| 2 | −2.45E−04 | 4.70E−03 | −1.45E−03 | 6.23E−04 | 3.41E−05 | −1.33E−04 |
| 3 | 4.56E−03 | −1.03E−02 | −1.10E−03 | 9.59E−04 | 1.98E−05 | −5.51E−04 |
| 4 | −3.99E−02 | −2.48E−01 | 1.63E−01 | 1.73E−01 | 2.90E−01 | 1.79E−01 |
| 6 | −1.30E−01 | −4.13E−01 | 3.48E−01 | −8.48E−02 | −1.45E−01 | −7.46E−02 |
| 7 | 5.00E−03 | 4.26E−03 | −3.93E−03 | 3.11E−04 | 1.94E−04 | 3.23E−04 |
| Surface Number | B14 | B15 | B16 | B17 | B18 | B19 | B20 |
| 1 | −4.11E−09 | −9.39E−10 | −9.36E−11 | −5.26E−11 | −7.83E−12 | 5.56E−12 | 3.13E−12 |
| 2 | −1.72E−04 | −1.43E−04 | −9.71E−05 | −3.30E−05 | −8.08E−06 | 8.05E−06 | 1.76E−05 |
| 3 | −5.61E−04 | −3.72E−04 | −4.14E−05 | −1.85E−04 | −5.45E−05 | 3.15E−05 | 9.00E−05 |
| 4 | 1.80E−01 | 9.07E−02 | 1.24E−01 | −6.00E−01 | −1.04E+00 | −2.98E+00 | 2.05E+00 |
| 6 | 1.09E−01 | 4.28E−01 | 7.46E−01 | −2.16E−01 | −1.08E+00 | −1.28E+00 | 1.54E+00 |
| 7 | 6.32E−05 | 4.08E−05 | −5.69E−05 | 3.72E−05 | 2.35E−05 | 7.10E−07 | −9.82E−06 |

TABLE 18

| | |
|---|---|
| f | 2.21 |
| f1 | −3.68 |
| f2 | 2.16 |
| f3 | 4.50 |
| f23 | 2.49 |
| 2ω | 97.4 |
| L(in Air) | 7.84 |
| Fno | 2.8 |

In the imaging lens 60, |f2/f3|=0.48, and $$0<|f2/f3|<0.49 \tag{1}$$

is satisfied. Moreover, ν3/ν2=1.85, and $$1.5<\nu3/\nu2 \tag{2}$$

is satisfied. Moreover, |f1/f23|=1.48, and $$0.5<|f1/f23|<3.0 \tag{3}$$

is satisfied. Moreover, L/f=3.55, and $$0<L/f<10.0 \tag{4}$$

is satisfied. Moreover, N1=1.51, and $$N1<1.80 \tag{5}$$

is satisfied. Moreover, R3/f=0.69, and $$R3/f<1.0 \tag{6}$$

is satisfied. Moreover, D1/f=0.54, and both expressions:

$$D1/f<1 \tag{7}$$

$$0.5<D1/f<0.8 \tag{8}$$

are satisfied. Moreover, R4/D3=−3.33, and both expressions:

$$2<|R4/D3|<6 \tag{9}$$

$$2.5<|R4/D3|<4.2 \tag{10}$$

are satisfied. Moreover, (D1+D3+D6)/f=2.15, and both expressions:

$$1.5<(D1+D3+D6)/f<4 \tag{11}$$

$$2<(D1+D3+D6)/f<3 \tag{12}$$

are satisfied.

When the first, second, and third lenses are formed by plastic, it is possible to realize an imaging lens in which highly accurate aspherical surfaces can be formed, and which is low in weight and cost. In the case where plastic is used as the material of the first lens in a use in which high weather resistance is requested as in an imaging lens for a vehicle camera, it is preferable that a coating for improving the acid resistance, the weather resistance, the water resistance, the strength, and the like is applied to the object-side surface of the first lens, or that a protective glass cover is disposed in front of the first lens. As the protective glass cover, a planar or curved plate having no refractive power may be used. The use of the imaging lens of the invention is not restricted to a vehicle camera, and the imaging lens can be used in a camera apparatus such as a camera for a portable telephone or a surveillance camera. In a use in which high weather resistance is requested as in an imaging lens for a vehicle camera, glass having excellent weather, water, and chemical resistance properties may be used as the material of the first lens.

Although description has been given heretofore of the invention with reference to the above-mentioned embodiments and examples, the invention is not limited to such embodiments and examples but various modifications are also possible. For example, the values of the radii of curvature, surface intervals and refractive indexes of the respective lens components are not limited to the values that are shown in the above-mentioned numerical examples, but other values can also be used. Also, in the above-mentioned embodiments and examples, the both surfaces of the first to fourth lenses are all formed as aspherical surfaces; however, the invention is not limited to this.

This application claims foreign priority from Japanese Patent Application No. 2006-268866, filed Sep. 29, 2006, the entire disclosure of which is herein incorporated by reference.

What is claimed is:

1. An imaging lens comprising: in order from an object side of the imaging lens, a first lens of a negative lens having a meniscus shape and having a convex surface on the object side thereof;

a second lens having at least one aspherical surface;

an aperture diaphragm; and a third lens of a positive lens having at least one aspherical surface and having a convex surface on an image side thereof, the imaging lens satisfying conditional expressions:

$$0<|f2/f3|<0.49 \tag{1}$$

$$1.5<\nu3/\nu2 \tag{2}$$

$$0.5<|f1/f23|<3.0 \tag{3}$$

wherein f1, f2, and f3 are focal lengths of the first lens, the second lens and the third lens, respectively, ν2, and ν3 are Abbe numbers of the second lens and the third lens, respectively, and f23 is a composite focal length of the second and third lenses.

2. The imaging lens according to claim 1, further satisfying conditional expression:

$$0<L/f<10.0 \tag{4}$$

wherein L is a distance between an apex of an object-side surface of the first lens and an image plane of the imaging lens, and f is a focal length of the imaging lens.

3. The imaging lens according to claim 2, wherein a material of each of the first and third lenses has an Abbe number of 40 or more, and a material of the second lens has an Abbe number of 40 or less.

4. The imaging lens according to claim 3, further satisfying conditional expression:

$$R3/f<1.0 \tag{6}$$

wherein R3 is a radius of curvature of an object-side surface of the second lens.

5. The imaging lens according to claim 4, further satisfying conditional expression:

$$D1/f<1 \tag{7}$$

wherein D1 is a distance between the apex on the object side of the first lens and that on the image side.

6. The imaging lens according to claim 5, further satisfying conditional expression:

$$2<|R4/D3|<6 \tag{9}$$

wherein R4 is a radius of curvature of an image-side surface of the second lens, and D3 is a center thickness of the second lens.

7. The imaging lens according to claim 1, wherein a material of each of the first and third lenses has an Abbe number of 40 or more, and a material of the second lens has an Abbe number of 40 or less.

8. The imaging lens according to claim 1, further satisfying conditional expression:

$$R3/f<1.0 \qquad (6)$$

wherein R3 is a radius of curvature of an object-side surface of the second lens.

9. The imaging lens according to claim 1, further satisfying conditional expression:

$$D1/f<1 \qquad (7)$$

wherein D1 is a distance between the apex on the object side of the first lens and that on the image side.

10. The imaging lens according to claim 1, further satisfying conditional expression:

$$2<|R4/D3|<6 \qquad (9)$$

wherein R4 is a radius of curvature of an image-side surface of the second lens, and D3 is a center thickness of the second lens.

11. A camera apparatus comprising:
an imaging lens according to claim 1, and
a solid-state imaging device that converts an optical image formed by the imaging lens to an electrical signal.

12. An imaging lens comprising: in order from an object side of the imaging lens,
a first lens of a negative lens having at least one surface aspherical surface and having a concave surface on an image side thereof;
a second lens having at least one aspherical surface;
an aperture diaphragm; and
a third lens of a positive lens having at least one aspherical surface and having a convex surface on the image side thereof,
the imaging lens satisfying conditional expressions:

$$0<|f2/f3|<0.49 \qquad (1)$$

$$1.5<v3/v2 \qquad (2)$$

$$0.5<|f1/f23|<3.0 \qquad (3)$$

$$N1<1.80 \qquad (5)$$

wherein f1, f2, and f3 are focal lengths of the first lens, the second lens and the third lens, respectively, v2, and v3 are Abbe numbers of the second lens and the third lens, respectively, N1 is a refractive index of the first lens at the d-line, and f23 is a composite focal length of the second and third lenses.

13. The imaging lens according to claim 12, wherein the first lens has a convex surface on the object side thereof.

14. The imaging lens according to claim 13, further satisfying conditional expression:

$$0<L/f<10.0 \qquad (4)$$

wherein L is a distance between an apex of an object-side surface of the first lens and an image plane of the imaging lens, and f is a focal length of the imaging lens.

15. The imaging lens according to claim 14, wherein a material of each of the first and third lenses has an Abbe number of 40 or more, and a material of the second lens has an Abbe number of 40 or less.

16. The imaging lens according to claim 15, further satisfying conditional expression:

$$R3/f<1.0 \qquad (6)$$

wherein R3 is a radius of curvature of an object-side surface of the second lens.

17. The imaging lens according to claim 16, further satisfying conditional expression:

$$D1/f<1 \qquad (7)$$

wherein D1 is a distance between the apex on the object side of the first lens and that on the image side.

18. The imaging lens according to claim 17, further satisfying conditional expression:

$$2<|R4/D3|<6 \qquad (9)$$

wherein R4 is a radius of curvature of an image-side surface of the second lens, and D3 is a center thickness of the second lens.

19. The imaging lens according to claim 12, further satisfying conditional expression:

$$0<L/f<10.0 \qquad (4)$$

wherein L is a distance between an apex of an object-side surface of the first lens and an image plane of the imaging lens, and f is a focal length of the imaging lens.

20. The imaging lens according to claim 12, wherein a material of each of the first and third lenses has an Abbe number of 40 or more, and a material of the second lens has an Abbe number of 40 or less.

21. The imaging lens according to claim 12, further satisfying conditional expression:

$$R3/f<1.0 \qquad (6)$$

wherein R3 is a radius of curvature of an object-side surface of the second lens.

22. The imaging lens according to claim 12, further satisfying conditional expression:

$$D1/f<1 \qquad (7)$$

wherein D1 is a distance between the apex on the object side of the first lens and that on the image side.

23. The imaging lens according to claim 12, further satisfying conditional expression:

$$2<|R4/D3|<6 \qquad (9)$$

wherein R4 is a radius of curvature of an image-side surface of the second lens, and D3 is a center thickness of the second lens.

24. A camera apparatus comprising:
an imaging lens according to claim 12, and
a solid-state imaging device that converts an optical image formed by the imaging lens to an electrical signal.

* * * * *